US012222276B2

(12) United States Patent
Baumgardner et al.

(10) Patent No.: US 12,222,276 B2
(45) Date of Patent: Feb. 11, 2025

(54) OPTICAL PARTICLE DETECTOR WITH FLUORESCENCE

(71) Applicant: Droplet Measurement Technologies, LLC, Longmont, CO (US)

(72) Inventors: Darrel Gibson Baumgardner, Taos, NM (US); Michael M. Carrabba, Ashland, OR (US)

( * ) Notice: Subject to any disclaimer, the term of this patent is extended or adjusted under 35 U.S.C. 154(b) by 311 days.

(21) Appl. No.: 17/723,139

(22) Filed: Apr. 18, 2022

(65) Prior Publication Data
US 2022/0341839 A1      Oct. 27, 2022

Related U.S. Application Data

(60) Provisional application No. 63/180,323, filed on Apr. 27, 2021.

(51) Int. Cl.
*G01N 15/1434* (2024.01)
*B64D 47/02* (2006.01)

(52) U.S. Cl.
CPC ......... *G01N 15/1434* (2013.01); *B64D 47/02* (2013.01); *B64D 2203/00* (2013.01)

(58) Field of Classification Search
CPC ........... G01N 15/0205; G01N 15/1434; G01N 15/1459; G01N 15/1429; G01N 15/075;
(Continued)

(56) References Cited

U.S. PATENT DOCUMENTS 6,012,675 A * 1/2000 Cocatre-Zilgien ..... B64D 43/00
  244/76 R
6,490,530 B1 * 12/2002 Wyatt ................ G01N 15/1459
  702/26

(Continued)

*Primary Examiner* — Dani Fox
*Assistant Examiner* — Soorena Kefayati
(74) *Attorney, Agent, or Firm* — Jones IP Law LLC; Huw R. Jones

(57) ABSTRACT

Embodiments of the invention are directed to an optoelectronic device for detection and identification of individual water droplets, ice crystals, dust particles and volcanic ash particles, the device comprising a source of ultraviolet collimated monochromatic radiation that illuminates an area of air external to the aircraft through which freely pass individual atmospheric particles to create an illuminated sample volume of air; an optical surveillance system for monitoring the clarity of light transmission through the light transmissive window to indicate a need for preventive maintenance; a first optical detection system that is constructed and arranged to collect light scattered from individual particles over an explicit angle ranging from 137° to 173° that defines the illuminated sample volume for measurement of S and P components of return scattered light from the sample volume to photodetectors that provide signals representative of intensity and change in polarization state caused by the interaction of particles with the incident illumination in the sample volume; a second optical detection system for selectively detecting fluorescence emanating from individual ash particles over an explicit angle ranging from 137° to 173° that defines the illuminated sample volume for measurement of fluoresence from the sample volume to a photodetector that provide a signal representative of intensity caused by the interaction of particles with the incident illumination in the sample volume; a signal processor that is constructed and arranged to condition the signals from the photodetectors by removing electronic noise, restoring baseline shifts and analyzing the pulse shapes to provide processed signals; a signal analyzer configured to operate upon the processed signals for extraction of data representing maximum amplitude, width, rise time and fall time of individual pulses in the S and P components, and the magnitude of the fluorescence signal which correlates to the size and/or composition of ash particles present; an information synthesizer that receives the data and produces analytical results allocated to particles by particle type including equivalent optical diameter (EOD), number and (Continued)

mass size distributions, and number and mass concentrations, the particle type being selected as at least one member among the group consisting of individual water droplets, ice crystals, dust particles and volcanic ash particles; and a report generator that creates an information packet utilizing information from the information synthesizer to assist in decision making related to hazard avoidance for aircraft flight, the optoelectronic system being adapted for mounting and operation on an aircraft.

13 Claims, 5 Drawing Sheets

(58) Field of Classification Search
CPC ........... G01N 15/06; G01N 2015/1497; G01N 2015/1493; G01N 2015/1486; G01N 2015/0294; G01N 2015/0026; G01N 2015/0046; G01N 2015/1027; B64D 43/00; B64D 2203/00; B64D 45/00; B64D 47/00; B64D 47/02
See application file for complete search history.

(56) References Cited

U.S. PATENT DOCUMENTS

| 7,173,257 | B1* | 2/2007 | Warrick | G01N 21/53 250/458.1 |
| 9,483,951 | B1* | 11/2016 | McCusker | B64D 45/00 |
| 2011/0058167 | A1* | 3/2011 | Knox | G08B 17/125 356/338 |
| 2011/0282870 | A1* | 11/2011 | Herzenberg | G01N 15/1429 707/723 |
| 2013/0103317 | A1* | 4/2013 | Ray | G01S 17/95 702/3 |
| 2014/0206093 | A1* | 7/2014 | Bjornson | B01L 3/0241 422/82.08 |
| 2014/0330459 | A1* | 11/2014 | Baumgardner | G01S 17/95 701/14 |
| 2015/0138355 | A1* | 5/2015 | Tillotson | G08G 5/0021 348/144 |
| 2018/0053063 | A1* | 2/2018 | Shemesh | H04N 5/33 |
| 2018/0217070 | A1* | 8/2018 | Keinan | G01N 21/31 |

* cited by examiner

OPTICAL PARTICLE DETECTOR WITH FLUORESCENCE

REFERENCE TO RELATED APPLICATIONS

This application is a nonprovisional utility patent application claiming priority to U.S. Provisional Patent Application Ser. No. 63/180,323 filed Apr. 27, 2021, incorporated herein by reference in its entirety.

BACKGROUND

The presently disclosed instrumentalities pertain to a hazard warning device for aircraft. In particular, the device detects potentially damaging airborne particulates in the immediate vicinity of the aircraft. More specifically, it is an electrooptical system that remotely senses and can distinguish water droplets, ice crystals, dust particles and volcanic ash using a Laser-based analysis system.

High concentrations of airborne particles present a hazard to aviation. These particles, especially water droplets, ice crystals, dust particles or volcanic ash particles, may contribute to such major problems as accidents and loss of life. The particles may also cause costly damage to aircraft parts. Aircraft at this time have limited systems for detecting when they are encountering these particles other than visual observations by the flight crew.

Commercial aircraft are equipped with forward looking radar systems for detecting precipitation-sized cloud particles that allow them to avoid regions with hail, lightning and other cloud phenomenon that could be hazardous for flight operations. These radar operate at a wavelength that is sensitive to hydrometeors larger than 100 µM, but cannot detect regions where there are very high ice crystal concentrations since these types of crystals are typically much smaller than 100 µM. Likewise, dust and ash particles are much smaller than 100 µM and cannot be detected by the aircraft weather radar system. Potentially hazardous dust and ash particles are found in thin layers that cannot be observed by the flight crew from below or above and are only visible when looking through them horizontally due to their optical thickness. When these layers are embedded in clouds, they are impossible to discern by eye.

Other than the weather radar, commercial aircraft may be equipped with the Back-scatter Cloud Probe with Polarization Detection (BCPD) from Droplet Measurement Technologies Inc., U.S. Pat. No. 9,222,873B2. The BPCD can discriminate between ice crystals and water droplets with the BCPD's polarization feature to detect when an aircraft encounters abnormally high concentrations of ice crystals.

BRIEF SUMMARY OF THE INVENTION

The presently disclosed instrumentalities overcome the problems outlined above and advance the art by providing an improved optoelectronic device for identifying individual water droplets, ice crystals, dust and volcanic ash particles and that works through an optical window of an aircraft. The term "water particles" refers to both water droplets and ice crystals, and unless the terms are used independently, encompasses both. The instrument can distinguish between certain particle types such as water droplets, ash and ice particles, and the improvement allows for further distinguishing between water droplets, ice crystals, and volcanic ash particles.

According to the '873 embodiment, an optoelectronic device detects and identifies individual particles as water droplets, ice crystals, dust particles and volcanic ash particles. A source of polarized, monochromatic radiation transmits light along an optical pathway to illuminate a sample volume of air external to the aircraft. Individual atmospheric particles pass through the sample volume. The optical pathway passes through a light transmissive window or aperture at the boundary of the aircraft skin. Return signals from scattered or reflected light are processed to provide the particle polarization information. A flight crew report generator then creates an information packet for aircraft flight crews to assist in decision making related to hazard avoidance. In an improved embodiment, a second optical system was added that processes fluorescent light from the same particles and can distinguish between particle types.

The '873 optical pathway has a number of components. An optical subsystem monitors the clarity of light transmission through the light transmissive window, and may provide an indicator warning if maintenance is required to clear the window. As more fully described in the '873 patent, the polarization optical subsystem collects light scattered from individual particles over an explicit collection angle from 137.degrees to 173.degrees. Photodetectors quantify the intensity and change in polarization state caused by the interaction of each particle with the incident illumination. A signal analyzer then extracts the maximum amplitude, width, rise time and fall time of individual pulses from the S and P detectors.

In an improved embodiment, another optical detection subsystem is added to the '873 optical train to collect fluorescence signals from the same volume of air the polarity signals are collected from, and is constructed and arranged to further process the light from the same illuminated sample volume for measurement of fluorescence from the particles caused by the interaction of the particles with the incident illumination in the sample volume. These fluorescence signals are then used in a confirmatory manner to distinguish between water particles, which do not significantly fluoresce, and ash particles, which have been discovered by the Inventors to detectably fluoresce.

As in the original '873 patent, an information synthesizer receives both fluorescence and polarization signals from the signal processors, identifies the particle type, derives the equivalent optical diameter (EOD), creates the particle number and mass size distributions, calculates number and mass concentrations, and sends the data to the online storage system and to the flight crew report generator. The fluorescence signals are then used to distinguish between the ash particles and the water particles, which provides unique information regarding volcanic ash, which is considered to be potentially injurious to the mechanical flight components, and which can allow the flight crew to take avoidance measures.

In one aspect, the source illumination beam is generated by a diode laser, of fixed wavelength, linear polarization and Gaussian intensity distribution. In an improved embodiment, an excitation wavelength less than about 400 nm is desired to generate sufficient fluorescent behavior from ash particles.

The polarization subsystem collection optics of the '873 patent are largely duplicated herein and so will not be described in detail. Readers are referred to the text of the '873 patent for the description.

BRIEF DESCRIPTION OF THE DRAWINGS

The invention will be understood more clearly and other advantages shall appear in the following description given on a purely non-restrictive basis with reference to the appended drawings in which.

DETAILED DESCRIPTION OF THE INVENTION

Embodiments of this invention comprise a novel and inventive improvement upon U.S. Pat. No. 9,222,873B2, the disclosure of which is incorporated herein in its entirety. Reference will be made to elements of the '873 patent including FIGS. 1-3 and component parts that are shared herein from time to time. The Parts List provided below is in two-column format, and the parts listed in the left column numbered 1-318 are from the disclosure of the '873 patent; parts in the right column are from the improvement embodiments described herein.

Figure 1:
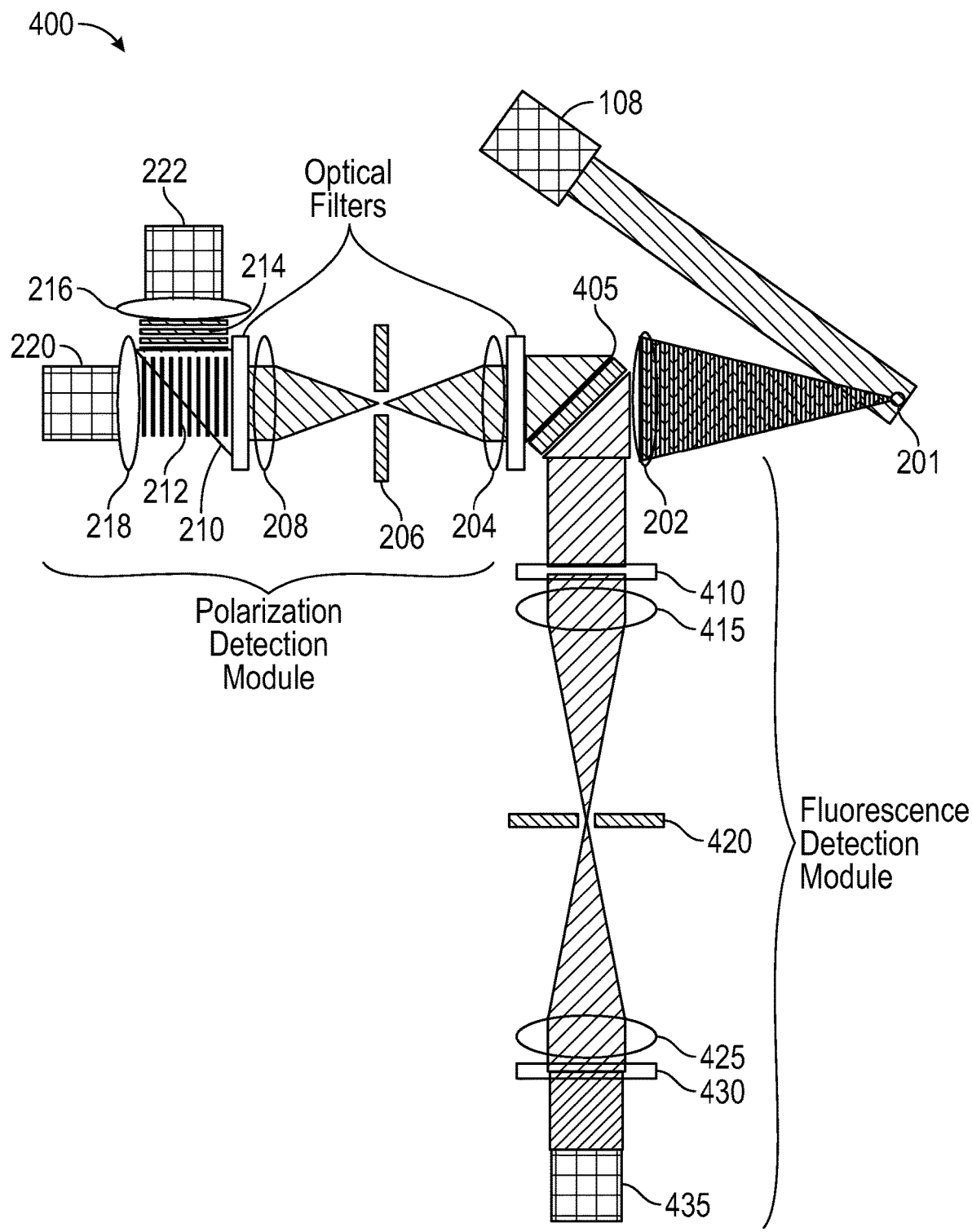
FIG. 1 illustrates the optical train components of a first embodiment of an improved optoelectronic device for the detection and identification of individual water droplets, ice crystals, dust particles and volcanic ash particles.

FIG. 1 illustrates the optical train components of a first embodiment of an improved optoelectronic device for the detection and identification of individual water droplets, ice crystals, dust particles and volcanic ash particles.

FIG. 1 shows the optoelectronic system 400 for detecting and processing two separate forms of signals from airborne particulates: fluorescent signals (Fluorescence Detection Module, or "FDM") and polarization signals (Polarization Detection Module or "PDM").

The PDM is substantially equivalent to that shown in the '873 patent, and is discussed by reference to '873 patent FIGS. 1-3 and its disclosure. In summary, the '873 patent FIG. 1 shows detection system 102 provides an optical pathway 106 for the transmission of light emanating from source 108. Source 108 directs light on pathway 106 into space 110 outside an aircraft and towards a sample volume 112. Light scattered by any individual water droplet, ice crystal, dust particle or volcanic ash particle in the sample volume 112 returns to an instrument interior 114 through a light-transmissive window or transparent aperture 116 in airplane skin 117. The optical pathway 106 terminates into an optical detection block 118. In this manner, the detection system 102 collects the light scattered by an individual water droplet, ice crystal, dust particle or volcanic ash particle in the sample volume 112.

Optical source 108 is a laser as shown in all of the figures as 108. In the improvement embodiment source 108 has a frequency of less than about 400 nm in order to provide the optimal excitation frequency for ash fluorescence. Example laser types having working emission frequencies may include Nd:YAG (355 nm), XeF (351 nm); Ruby (347 nm); and diode lasers such as a 375 nm single mode, SN NDU4116 from Nichia, Tokyo, Japan. In one embodiment the Nichia laser diode emits in the ultraviolet between frequencies 370 nm-380 nm.

Figure 2:
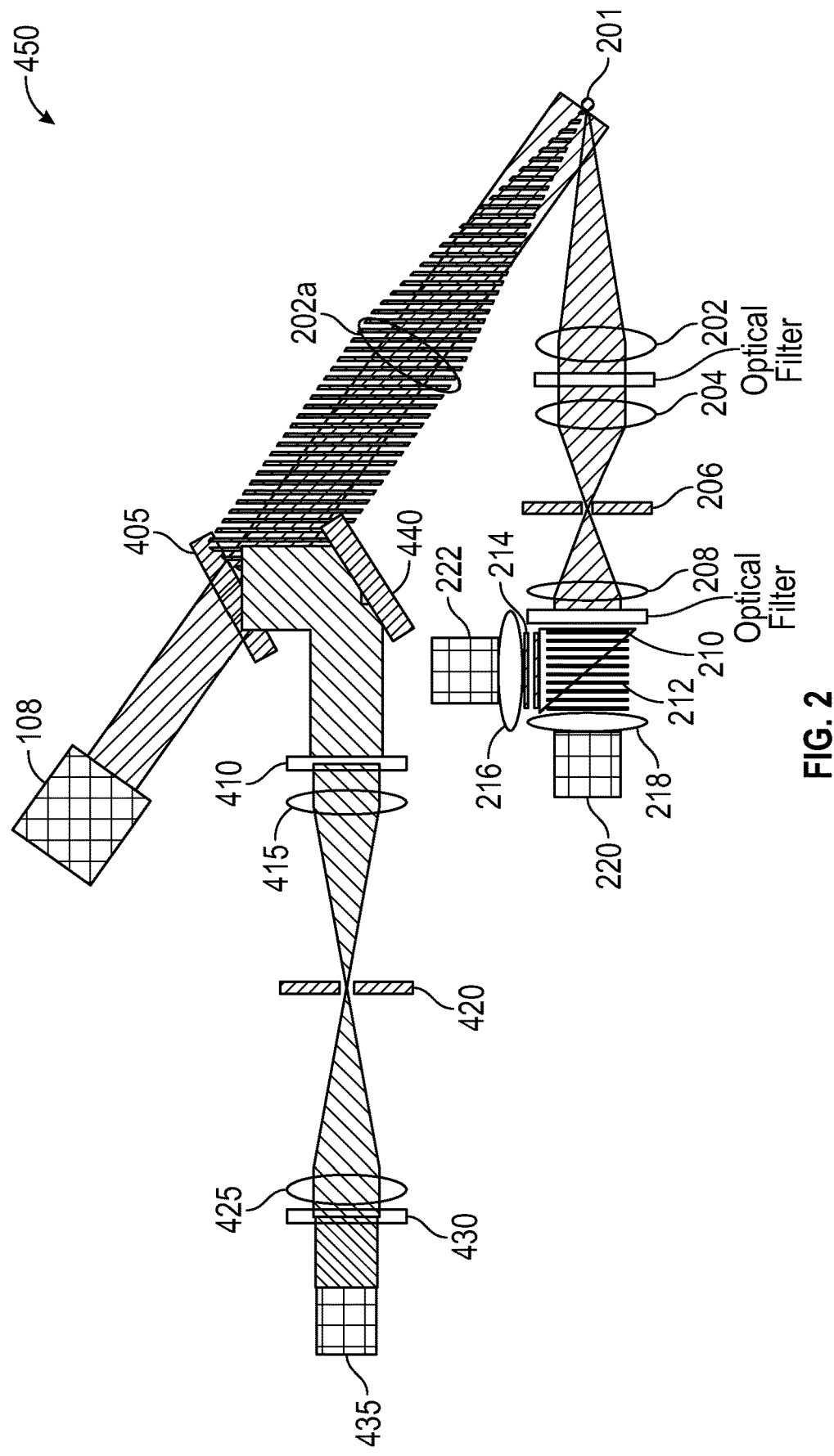
FIG. 2 illustrates the optical train components of a second embodiment of an improved optoelectronic device for the detection and identification of individual water droplets, ice crystals, dust particles and volcanic ash particles.

FIG. 2 of the '873 patent provides additional detail about PDM 102 according to one embodiment. As previously described source 108 is a polarized diode laser directing its beam on pathway 106 through a fused silica light transmissive window 116 that is mounted in aircraft skin 200, which is optionally heated to eliminate excess moisture. The laser beam on pathway 106 illuminates an individual particle 201 that passes through sample volume 112, which may be a volume of air outside the aircraft.

A configuration of collimating and focusing lenses 202, 204 collect the light scattered by particle 201 over angles ranging from about 137 degree to about 173 degrees. These angles have been selected through optical calculations to produce the optimum intensity of scattered light from each particle 201. The collimating and focusing lenses 202, 204 direct the collected, scattered light on pathway 106 through a slit aperture 206 having an angle, aperture length and width that define the size of the sample volume 112.

A collimating lens 208 directs light to a polarized beam splitter 210 that separates the scattered light into two components 212, 214, each having a polarization that is perpendicular to one another. The respective components 212, 214 are then directed by the corresponding focusing lenses 216, 218 onto the avalanche photo diodes (APDs) 220, 222, which are detectors that convert the scattered light photons into an electric current. APD 220 represents the "P" detector associated with scattered light with polarization parallel to that of the incident laser light, and the "S" APD 222 designates the detector associated with scattered light with polarization perpendicular to that of the incident laser light. This optical configuration is carried over to the improvement embodiment for the PDM. However, other detector types capable of detecting fluorescence emissions are also within the scope of the inventions, and one is a Photomultiplier Tube ("PMT").

Figure 3:
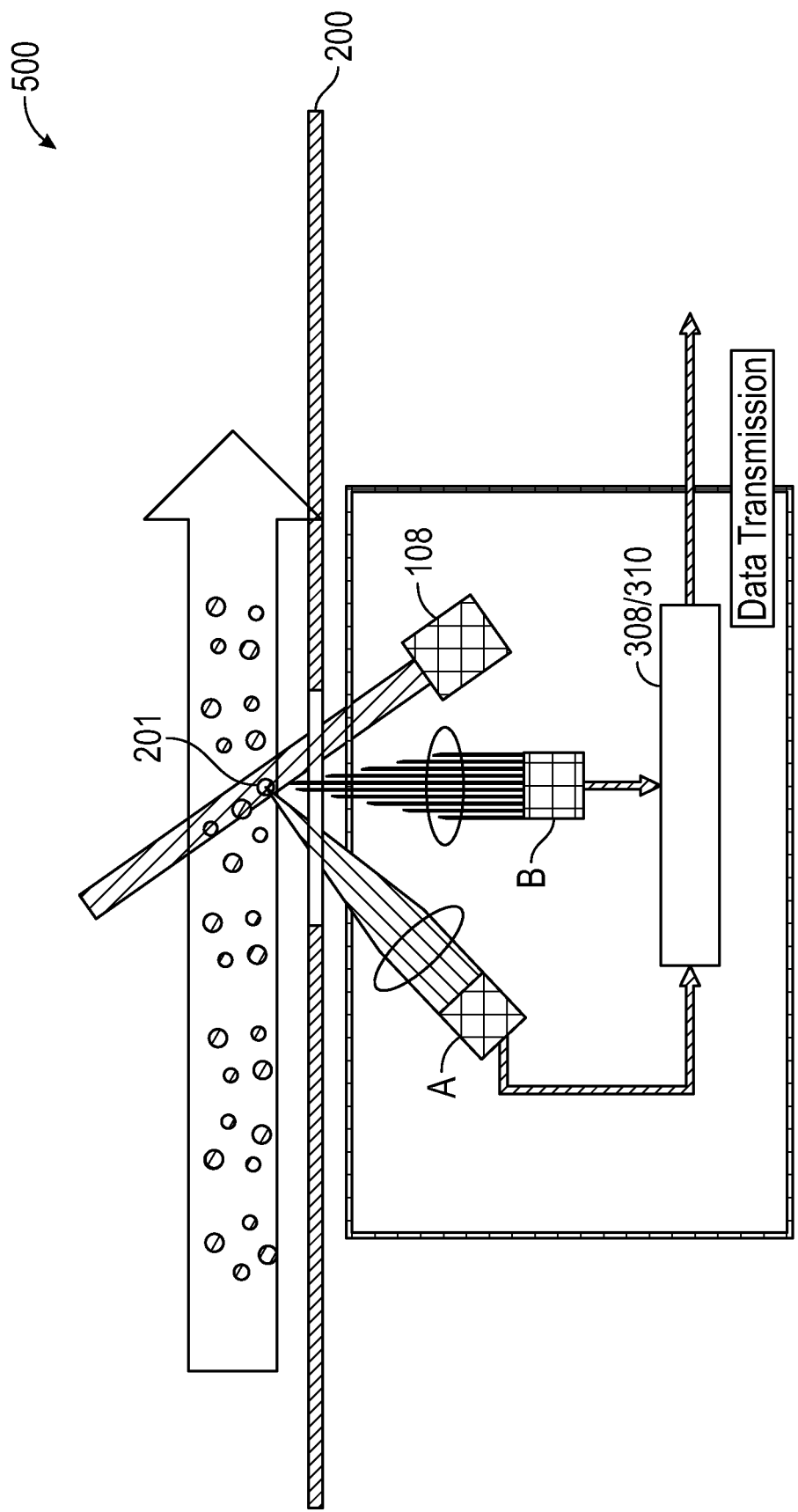
FIG. 3 illustrates the optical train components of a third embodiment of an improved optoelectronic device for the detection and identification of individual water droplets, ice crystals, dust particles and volcanic ash particles.
Figure 3A:
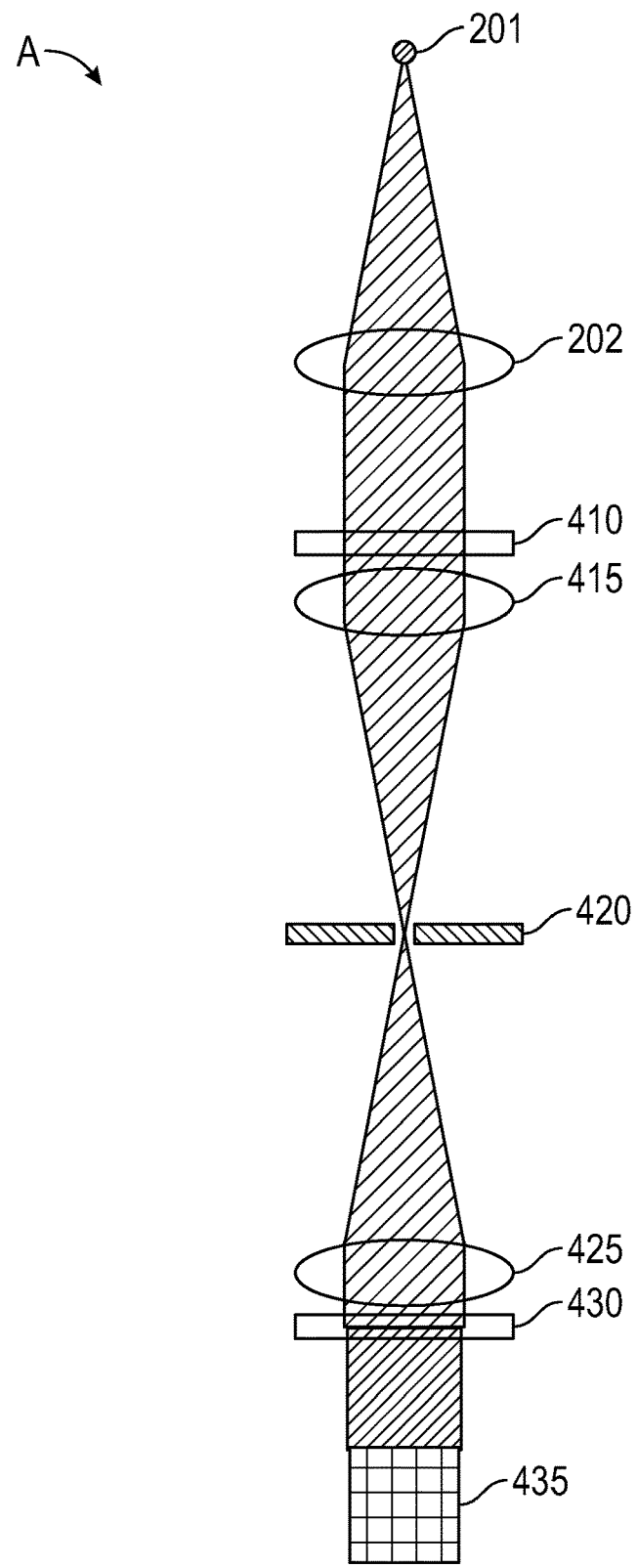
FIG. 3A illustrates the fluorescence detection optical subsystem of the improvement invention.
Figure 3B:
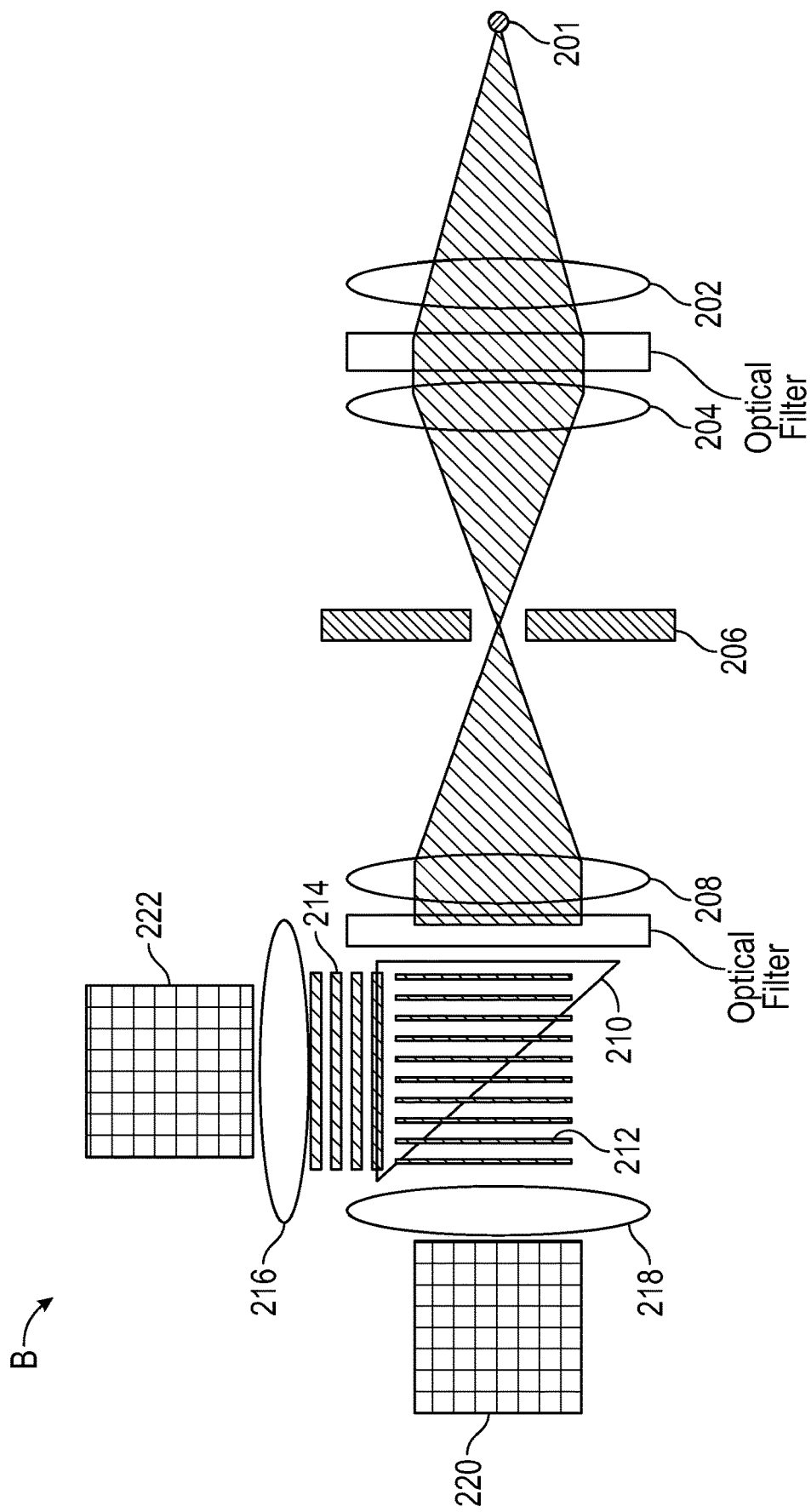
FIG. 3B illustrates the polarization detection optical subsystem of the improvement invention.

FIG. 3 of the '873 patent provides additional detail about the information processing and reporting system 104 according to one embodiment. Signal processor 120 receives separate signals 300, 302 from APDs 220, 222, respectively. Signal processor 120 converts the signals, such as by converting current to voltage, with amplifiers 304, 306 passing these voltages to signal conditioners 308, 310. The signal conditioners 308, 310 filter electronic noise and remove offsets to restore a signal baseline before passing the signals to shape analyzers 312P, 312S, which extract the peak heights, areas, widths, rise times and decay times for the "P" and "S" signals from each particle.

An information synthesizer 314 is for example, a neural network or multivariate parameter analyzer operating upon the signal shapes, for example, including the respective peak heights, areas, widths, rise times and decay times from the "P" and "S" polarized signals. This input is submitted into a neural network that has been trained using actual atmospheric particles, crystal analogs and model simulations to produce output that identifies the particles by size and type, i.e., water droplets, different shapes of ice crystals, dust particles and volcanic ash particles. In addition, the information synthesizer derives the particle velocity and equivalent optical diameter (EOD) from which the number and mass concentration size distribution is assessed over fixed intervals of time.

FIG. 1 of the improvement embodiment adds a first embodiment of the Fluorescence Detection Module ("FDM") to the polarization detection module optical path. Beginning at source 108 which may be a laser diode having an emission frequency less than or equal to about 400 nm, particle 201 is irradiated and emits either or both fluorescence or scattered light. As detailed above in reference to the '873 patent, the PDM optical train detects and analyzes scattered light by separating it into P and S elements, then separately analyzes those. Two optical filters have been added to the PDM, shown in FIG. 1 located after FDM Beam Splitter 405 and collimating lens 208, respectively. Beginning at FDM Beam Splitter 405, fluorescence (if present) is separated from scattered light, which continues through a Beam Splitter 405, e.g. a dichroic beam splitter, to enter the PDM optical path. The beam splitter separates the fluorescence signal which is directed orthogonally and in the downward direction as depicted in FIG. 1 where it next encounters FDM Optical Filter 1 (410). Beam splitters useful in the present invention include dichroic or holographic beam splitters, although other equivalent filters may also be known to those of ordinary skill in the art. FDM Focusing Lens 415 then focuses and directs fluorescence onto FDM spatial filter (or slit aperture) 420. FDM spatial filter 420 is adapted to minimize ambient light from the fluorescence signal. The fluorescence then is collimated again at FDM collimating lens 425, filtered by FDM Optical Filter 2 (430), and then detected by FDM APD/detector 435. The detector may be optimized to detect emission wavelengths of from 340 to 400 nms. FDM filters 1 and 2 (410, 430 respectively) are adapted to block both Laser and ambient light from interfering with the fluorescent signal.

FIG. 2 is a schematic of Embodiment 2 of the current improvement invention, optoelectronic system 450. The primary differences between embodiment 1 and this is the optical train has added to it lens 202a, which is a dual-function lens that focuses Laser energy, and also collimates the fluorescent signal from the particles; and a mirror 440 to re-direct the fluorescence signal coming from FDM beam splitter 405 to the optical train ending at FDM detector 435.

FIG. 3 is a schematic of a third embodiment of the current improvement invention, optoelectronic system 500. The primary difference between this embodiment and the prior two embodiments is that the PDM and FDM have separate optical collection subsystems, i.e., they do not share any of the internal collection optics. As in the prior embodiments, laser source 108 is directed externally to the aircraft and irradiates a volume of air passing the aircraft surface 200. Particle 201 encounters the laser irradiation, in one embodiment ultra-violet radiation, and is stimulated to scatter and/or fluoresce, depending upon the nature of the particle. E.g., if it is a water droplet or ice crystal, it will not fluoresce, but it will scatter the light. If it is an ash particle, it will have some detectable degree of fluorescent signal, which is then collected by the FDM (shown as "A" in FIG. 3). Scattered light will be collected by the PDM ("B"). Signal processor(s) 308/310 will then analyze the scattered light in the manner described in the '873 patent, with the addition of the fluorescent signal. Fluorescence has surprisingly been correlated with the presence of ash particles; a discovery believed by the Inventors to be original with them. The fluorescent signal is thus confirmatory of the presence of ash particles. The magnitude of the signal has been directly correlated with the size and/or composition of the ash particle present.

Optical subsystems A and B in FIG. 3 may be flexibly employed in terms of their exact locations within the optical module housing the system. So long as the 137 degree/173 degree range is observed for the PDM subsystem, the FDM subsystem may be located independent of the angle at which it collects the fluorescent signal.

The fluorescent signal is analyzed in signal processor 308/310, and Information Synthesizer 314 compares the overall polarization signal to the fluorescent signal.

Given that the aircraft on which this instrument is operated can travel over a range of velocities, signal processor 120 and information synthesizer 314 preferably use state of the art high speed analog and digital electronics to digitize pulses that are less than a microsecond in length and a Field Programmable Gate Array (FPGA) to implement the neural network in real-time.

A reporting system 316 that takes the information from information synthesizer 314 and presents the data on particle number, concentration, liquid water concentration, ice water fraction, and presence or absence of fluorescence and other parameters as needed by the flight crew to make informed decisions about environmental conditions that might impact the performance of the aircraft.

A data storage system 318 records all the raw data necessary to monitor the sufficiency of the detection and information processing system 100 in addition to the S and P electrical signals, and presence or absence of fluorescence that are used to derive particle type and EOD. The data storage system is of high capacity sufficient to record up to one hundred hours of flight and is easily removable for offline data transfer.

The foregoing disclosure teaches by way of example, and not by limitation. Those skilled in the art will appreciate that what is described may be subjected to insubstantial changes without departing from the true scope and spirit of the invention. Accordingly, the inventors hereby state their intention to rely upon the Doctrine of Equivalents if needed to protect their full rights to what is claimed.

LISTING OF THE PARTS OF THE INVENTION

| No. | '873 Parts Description | No. | Improvement Parts Description |
|---|---|---|---|
| 100 | Optoelectronic device | 400 | Optoelectronic system of FIG. 1 |
| 102 | Polarization Detection system or module ("PDM") | 405 | FDM Beam Splitter |
| 104 | Information processing and reporting system | 410 | FDM Optical Filter 1 |
| 106 | Optical pathway | 415 | FDM Focusing Lens |
| 108 | Optical source | 420 | FDM Spatial Filter |
| 110 | Space | 425 | FDM Collimating Lens |
| 112 | Sample volume | 430 | FDM Optical Filter 2 |
| 114 | Instrument interior | 435 | FDM Detector |
| 116 | Light-transmissive window or transparent aperture | 440 | FDM Mirror |
| 117 | Airplane skin | 450 | Optoelectronic system of FIG. 2 |
| 118 | optical detection block | 500 | Optoelectronic system of FIG. 3 |
| 120 | Signal processor | A | Fluorescence Detection Module of FIG. 3 |

-continued

| No. | '873 Parts Description | No. | Improvement Parts Description |
|---|---|---|---|
| 122 | Information synthesizer | B | Polarization Detection Module of FIG. 3 |
| 126 | Flight crew display | | |
| 200 | aircraft skin | | |
| 201 | individual particle | | |
| 202 | collimating lens | | |
| 204 | focusing lenses | | |
| 206 | slit aperture | | |
| 208 | collimating lens | | |
| 210 | polarized beam splitter | | |
| 212 | scattered light having a polarization that is perpendicular to 214 | | |
| 214 | scattered light having a polarization that is perpendicular to 212 | | |
| 216 | focusing lenses | | |
| 218 | focusing lenses | | |
| 220 | avalanche photo diode (APD) or detector | | |
| 222 | avalanche photo diode (APD) or detector | | |
| 300 | P Signal | | |
| 302 | S Signal | | |
| 304 | P Amp | | |
| 306 | S Amp | | |
| 308 | P Signal processor | | |
| 310 | S Signal processor | | |
| 312S | S Shape Analyzer | | |
| 312P | P Shape analyzer | | |
| 314 | Information synthesizer | | |
| 316 | Output | | |
| 318 | Storage | | |

We claim:

1. An optoelectronic device for detection and identification of individual water droplets, ice crystals, dust particles or volcanic ash particles when the individual water droplets, ice crystals, dust particles or volcanic ash particles are present in an illuminated volume of air, the device comprising:
a source of ultraviolet collimated monochromatic radiation that illuminates a volume of air external to an aircraft through which freely pass individual atmospheric particles to create the illuminated sample volume of air;
an optical surveillance system for monitoring a clarity of light transmission through the light transmissive window to indicate a need for preventive maintenance;
a first optical detection system that is constructed and arranged to collect light scattered from individual particles when present over an explicit angle ranging from 137° to 173° that defines the illuminated sample volume for measurement of S and P components of return scattered light from the sample volume comprising photodetectors that provide signals representative of intensity and change in polarization state caused by an interaction of particles with the incident illumination in the sample volume;
a second optical detection system for selectively detecting fluorescence emanating from individual ash particles when present over an explicit angle ranging from 137° to 173° that defines the illuminated sample volume for measurement of fluorescence from the sample volume comprising a photodetector that provides a signal representative of intensity caused by the interaction of particles with the incident illumination in the sample volume;
a signal processor that is constructed and arranged to condition the signals from the photodetectors by removing electronic noise, restoring baseline shifts and analyzing the pulse shapes to provide processed signals;
a signal analyzer configured to operate upon the processed signals for extraction of data representing maximum amplitude, width, rise time and fall time of individual pulses in the S and P components, and the magnitude of the fluorescence signal which correlates to the size and/or composition of ash particles present;
an information synthesizer that receives the data and produces analytical results allocated to particles by particle type including equivalent optical diameter (EOD), number and mass size distributions, number and mass concentrations, the particle type being selected from at least one member of the group consisting of individual water droplets, ice crystals, dust particles and volcanic ash particles; and
a report generator that creates an information packet utilizing information from the information synthesizer to assist in decision making related to hazard avoidance for aircraft flight, the optoelectronic system being constructed for mounting and operation on an aircraft.

2. The optoelectronic device according to claim 1, wherein a diode laser is provided as the source of collimated monochromatic radiation to generate an illumination beam as one having fixed wavelength, linear polarization and Gaussian intensity distribution.

3. The optoelectronic device according to claim 1, wherein the information synthesizer includes a neural network that is trained to operate upon peak heights, peak areas, widths, rise times and decay times of the S and P components.

4. The optoelectronic device according to claim 1, wherein the second optical detection system shares the source of the ultraviolet radiation with the first optical detection system.

5. A method of detecting and identifying individual water droplets, ice crystals, dust particles and volcanic ash particles when the individual water droplets, ice crystals, dust particles or volcanic ash particles are present in an illuminated volume of air, by use of the optoelectronic device according to claim 1 on an aircraft, the method comprising the steps of:
- illuminating a volume of air external to the aircraft by use of the source of collimated monochromatic radiation surveilling the clarity of light transmission by use of the optical surveillance system;
- collecting light scattered from individual particles when present over the explicit solid angle ranging from 137° to 173° by use of the optical detection system;
- collecting fluorescent light emitted from individual ash particles when present over the explicit solid angle ranging from 137° to 173° by use of the second optical detection system;
- a signal processor that is constructed and arranged to condition the signals from the photodetectors by removing electronic noise, restoring baseline shifts and analyzing the pulse shapes to provide processed signals;
- extracting from the signals the data representing the maximum amplitude, width, rise time and fall time of individual pulses in the S and P components by use of the signal analyzer, and the magnitude of the fluorescence signal which correlates to the size and/or composition of ash particles present; and
- producing the analytical results in real time by use of the information synthesizer.

6. The optoelectronic device of claim 1, wherein the information synthesizer provides the data by particle type for all members of said group.

7. The optoelectronic device of claim 1, wherein the information synthesizer includes a neural network of a nature that is trained utilizing laboratory measurements with water droplets, ice crystals, dust particles and volcanic ash.

8. The optoelectronic device according to claim 2, wherein the first optical detection system includes a slit aperture of fixed width, height and angle with respect to the collection optics and illuminated volume.

9. The optoelectronic device according to claim 8, wherein the first optical detection system is constructed to collect light scattered by individual particles after passing through the slit aperture and direct such light to a polarized beam splitter that separates the light into the S and P components as: 1) one whose angle of polarization is parallel to that of the incident laser beam and 2) one whose angle of polarization is perpendicular to the incident laser beam.

10. The optoelectronic device according to claim 9, wherein the S and P components are respectively focused on individual, avalanche photodetectors that convert the scattered light photons to an electrical current that is processed to remove electronic noise and baseline drifts, analyzed to measure the detailed shape of the signal, more specifically to measure the a peak, width, area, rise and fall times and non-Gaussian features of the two polarized components produced by each individual particle detected in the viewing volume.

11. The optoelectronic device according to claim 10, wherein the signal analyzer includes a neural network that is implemented through programming of a floating point gated array to assess particle type.

12. The optoelectronic device according to claim 11, further comprising a reporting system that presents information from the information synthesizer in a textual and graphical format for facilitating informed decisions about flight operations affected by the presence of water droplets, ice crystals, dust particles or volcanic ash particles.

13. The optoelectronic device of claim 7, wherein the neural network is trained utilizing computational results from a numerical model utilizing Taylor-Maxwell equations.

* * * * *